United States Patent
Jindal et al.

(10) Patent No.: US 12,093,820 B2
(45) Date of Patent: Sep. 17, 2024

(54) AUTOMATIC GENERATION OF AN API INTERFACE DESCRIPTION

(71) Applicant: Traceable Inc., San Francisco, CA (US)

(72) Inventors: Shubham Jindal, Neemrana (IN);
Avinash Kolluru, Bangalore (IN);
Ravindra Guntar, Hyderabad (IN);
Inon Shkedy, San Franciusco, CA (US)

(73) Assignee: Traceable Inc., San Francisco, CA (US)

( * ) Notice: Subject to any disclaimer, the term of this patent is extended or adjusted under 35 U.S.C. 154(b) by 0 days.

(21) Appl. No.: 17/339,949

(22) Filed: Jun. 5, 2021

(65) Prior Publication Data

US 2022/0318081 A1    Oct. 6, 2022

Related U.S. Application Data (60) Provisional application No. 63/167,649, filed on Mar. 30, 2021.

(51) Int. Cl.
G06F 9/54        (2006.01)
G06F 16/901      (2019.01)
(Continued)

(52) U.S. Cl.
CPC ............. G06N 3/08 (2013.01); G06F 9/541 (2013.01); G06F 9/543 (2013.01); G06F 9/547 (2013.01);
(Continued)

(58) Field of Classification Search
CPC .. G06N 3/08; G06N 3/04; G06F 9/541; G06F 9/543; G06F 9/547; G06F 16/9027;
(Continued)

(56) References Cited

U.S. PATENT DOCUMENTS

2019/0243692 A1* 8/2019 Lincoln ................ G06F 9/541
2020/0036739 A1* 1/2020 Novikov ............... G06N 20/00
(Continued)

OTHER PUBLICATIONS

Laughter et al., "Detection of Malicious HTTP Requests Using Header and URL Features" (Nov. 1, 2020), pp. 449-468 [retrieved from https://link.springer.com/chapter/10.1007/978-3-030-63089-8_29]. (Year: 2020).*
(Continued)

*Primary Examiner* — Brian W Wathen
(74) *Attorney, Agent, or Firm* — Riyon Rae Harding (57) ABSTRACT

A system analyzes APIs and automatically generates an API description for the system. The APIs each have an API behavior, which can include a request and a response. Each request and response can have different components. The present system automatically learns characteristics and patterns in the request and response components. As clients engage an API, the component data in the requests and responses for the API are monitored and distributions for various characteristics are determined. Once the API description is automatically generated by the system, the API description can be compared to incoming API requests to identify anomalies that can be associated with users without proper credentials.

18 Claims, 7 Drawing Sheets

(51) Int. Cl.
  *G06F 16/955* (2019.01)
  *G06F 21/55* (2013.01)
  *G06N 3/04* (2023.01)
  *G06N 3/08* (2023.01)
  *H04L 9/40* (2022.01)
  *H04L 67/133* (2022.01)

(52) U.S. Cl.
  CPC ...... *G06F 16/9027* (2019.01); *G06F 16/9566* (2019.01); *G06F 21/552* (2013.01); *G06N 3/04* (2013.01); *H04L 63/1425* (2013.01); *H04L 67/133* (2022.05); *G06F 2221/034* (2013.01)

(58) Field of Classification Search
  CPC ............... G06F 16/9566; G06F 21/552; G06F 2221/034; H04L 63/1425; H04L 67/133; H04L 67/303; H04L 67/02
  See application file for complete search history.

(56) References Cited

U.S. PATENT DOCUMENTS

2020/0125954 A1* 4/2020 Truong ................. G06F 40/205
2022/0006829 A1* 1/2022 Nikam ................ H04L 63/1466

OTHER PUBLICATIONS

Sohan, S.M., "Automated Example Oriented REST API Documentation" (2017), pp. 1-156 [retrieved from https://prism.ucalgary.ca/handle/11023/4244]. (Year: 2017).*

* cited by examiner

AUTOMATIC GENERATION OF AN API INTERFACE DESCRIPTION

CROSS REFERENCE TO RELATED APPLICATIONS

The present application claims the priority benefit of U.S. provisional patent application 63/167,649, filed on Mar. 30, 2021, titled "INTELLIGENT APPLICATION PROTECTION," the disclosure of which is incorporated herein by reference.

BACKGROUND

When analyzing, tracking, or monitoring a system, it is often important to know the specification of the system, including application program interface (API) specifications. However, when monitoring a new system, the API specification and related data is often unknown. This forces administrators and users working with the system to work with uniform resource locators (URL), and for example associate each URL with a particular API. This results in very large numbers of APIs, which requires a large number of resources to work with. What is needed is an improved method for naming APIs.

SUMMARY

The present technology, roughly described, analyzes APIs for a system and automatically generates an API description for the system. The APIs each have an API behavior, which can include a request and a response. Each request and response can have different components. The present system automatically learns characteristics and patterns in the request and response components. In some instances, the present system can learn API request and response component characteristics based on a distribution of occurrences. The occurrences may be detected as the system receives data about actual API usage between a system and clients. As clients engage an API, the component data in the requests and responses for the API are monitored and distributions for various characteristics are determined. The components can include path parameters, query parameters, request headers, request body, response header, and response body. The characteristics can include parameter types (starting, integer, float, etc.), sensitivity, character distribution, and other characteristics. Once the API description is automatically generated by the system, the API description can be compared to incoming API requests to identify anomalies that can be associated with users without proper credentials.

In some instances, a method automatically determines a description of interfaces to APIs for a web service. The method includes receiving, by a server from an agent stored on a remote server, API requests sent from a plurality of users to server APIs, the requests intercepted by the agent on the remote server. Components of the API requests are automatically detected by an application on the server, the components including URL parameters, API request header data, and API request body data. A correct set of request components can be automatically learned by the application based on the API components detected by the application. Anomaly requests to the server API are detected based on comparing subsequent server API requests to the learned correct set of request components.

In some instances, a non-transitory computer readable storage medium has embodied thereon a program that is executable by a processor to perform a method. The method includes receiving, by a server from an agent stored on a remote server, API requests sent from a plurality of users to server APIs, the requests intercepted by the agent on the remote server. Components of the API requests are automatically detected by an application on the server, the components including URL parameters, API request header data, and API request body data. A correct set of request components can be automatically learned by the application based on the API components detected by the application. Anomaly requests to the server API are detected based on comparing subsequent server API requests to the learned correct set of request components.

In embodiments, a system can include a server, memory and one or more processors. One or more modules may be stored in memory and executed by the processors to receive, by a server from an agent stored on a remote server, API requests sent from a plurality of users to server APIs, the requests intercepted by the agent on the remote server, automatically detect components of the API requests by an application on the server, the components including URL parameters, API request header data, and API request body data, automatically learn a correct set of request components by the application based on the API components detected by the application, and detect anomaly requests to the server API based on comparing subsequent server API requests to the learned correct set of request components.

DETAILED DESCRIPTION

The present system analyzes APIs for a system and automatically generates an API description for the system. The APIs each have an API behavior, which can include a request and a response. Each request and response can have different components. The present system automatically learns characteristics and patterns in the request and response components. In some instances, the present system can learn API request and response component characteristics based on a distribution of occurrences. The occurrences may be detected as the system receives data about actual API usage between a system and clients. As clients engage an API, the component data in the requests and responses for the API are monitored and distributions for various characteristics are determined. The components can include path parameters, query parameters, request headers, request body, response header, and response body. The characteristics can include parameter types (starting, integer, float, etc.), sensitivity, character distribution, and other characteristics. Once the API description is automatically generated by the system, the API description can be compared to incoming API requests to identify anomalies that can be associated with users without proper credentials.

Figure 1:
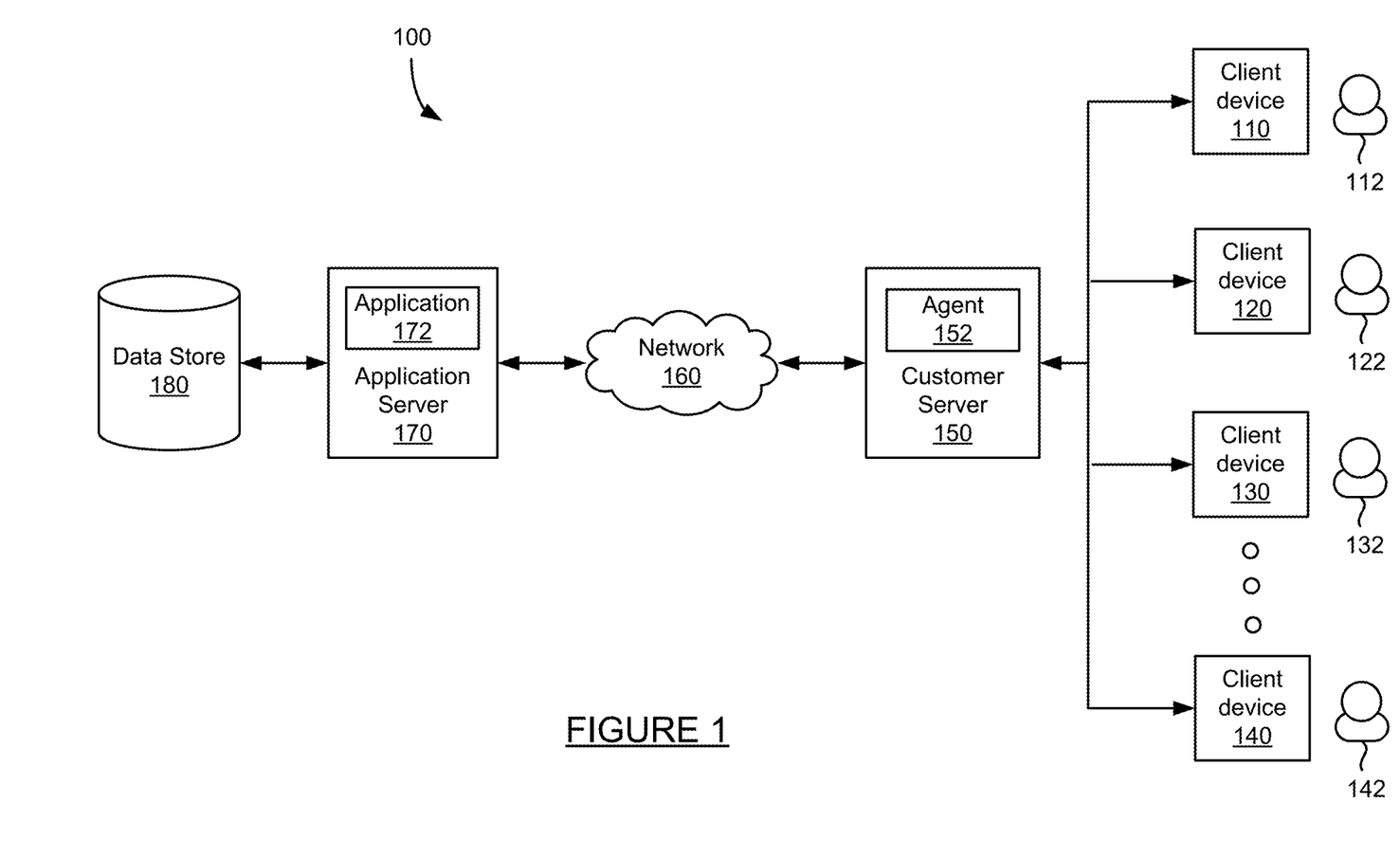
FIG. 1 is a block diagram of a system for intelligently naming APIs.

FIG. 1 is a block diagram of a system for intelligently naming (i.e., generating) APIs. The block diagram 100 of FIG. 1 includes client devices 110-140, customer server 150, network 160, Application server 170, and data store 180.

Client devices 110-140 may send requests to and receive responses from customer server 150. The client devices may be any device which can access the service, network page, webpage, or other content from customer server 150. Client devices 110-140 may send a request to customer server 150, for example to an API provided by customer server 150, and customer server 150 may send a response to the devices based on the request. The request may be sent to a particular URL provided by customer server 15- and a response may be sent from the same URL or different URLs. Though only for four client devices are shown, any number of client devices may be used to interact with customer server 150.

Customer server 150 may provide a service to client devices 110-140. Agent 152 on customer server 150 may monitor the communication between customer server 150 and client devices 110-140 and intercept traffic between the server and the devices. Upon intercepting the traffic, agent 152 may forward the traffic to application 172 on application server 170. In some instances, one or more agents may be installed on customer server 150, which may be implemented by one or more physical or logical machines. In some instances, server 150 may actually be implemented by multiple servers in different locations, providing a distributed service for devices 110-140. In any case, one or more agents 152 may be installed to intercept requests and responses sent between devices 110-140 and customer server 150 and for those requests and responses to application 172 on server 170.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks. Client devices 110-140, customer server 150, Application server 170, and data store 180 may all communicate over network 160.

Application server 170 may be implemented as one or more physical or logical machines that provide application functionality as described herein. In some instances, application server may include one or more applications 172. The application 172 may be stored on one or more application servers 170 and be executed to perform functionality as described herein. Application server and application 172 may both communicate over network 160 and data store 180. In some instance, data store 180 may include one or more APIs, API descriptions, and other data.

Figure 2:
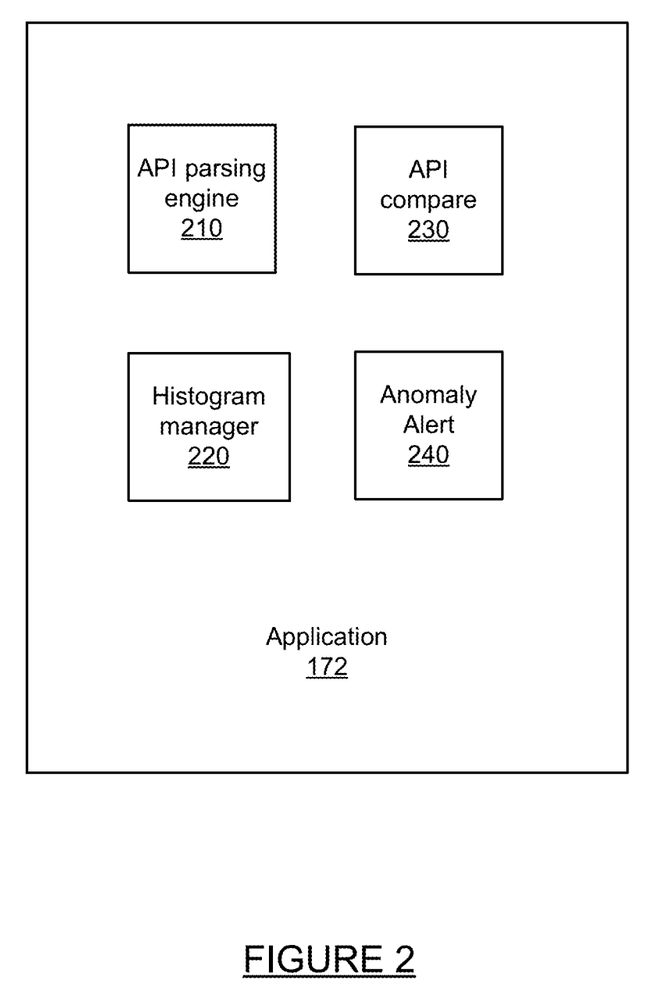
FIG. 2 is a block diagram of an application that automatically generates an API description.

FIG. 2 is a block diagram of an application that automatically generates an API description. Application 172 of FIG. 2 provides more detail for application 172 of the system of FIG. 1. Application 172 includes API parsing engine 210, histogram manager 220, API compare module 230, and anomaly alert 240. API parsing engine 210 may access and detect components of API requests. The engine 210 may detect path parameters, query parameters, request header content, request body content, response API headers and bodies, and other content within a URL, request, or response associated with an API.

API parsing engine can also detect portions of each component as they are detected by a remote agent. For example, each API parsing engine can detect component parameters, sensitivity, character distributions, and other data. Component parameters may include a variable type, such as an integer string, or float. Component sensitivity can include private information, such as credit card information, password information, security question information, email data, and other data that users may prefer to keep quiet or may be used to compromise their account, their finances, or other personal details. Character distribution identification and/or tracking may include detecting the location and number of occurrences of a particular character, for example in a URL, API request header or body, or API response body. The characters may include special characters colon, semi-colon, slash, question marks, exclamation marks, asterisks, parenthesis, and other nun-numeric and non-alphabet characters.

Histogram manager 220 may generate update, and manage a histogram for each of a plurality of APIs. For example, histogram manager 220 may maintain a histogram for the occurrence of a particular API, API components, parameters, parameter types, parameter values, value length, character distribution, cookies, authorization tokens, JSON objects, sensitivity, and other data with respect to an API. API compare module 230 may compare an API to a generated baseline for an API. Anomaly alert 240 may generate alerts based on comparison results of the API compare module 230. For example, if a subsequent request is detected to be an anomaly from an automatically determined API request description, the API compare unit may send a message with information about the anomaly to anomaly alert 240, which can then generate an alert for an administrator in a system, for example via message, email, through an interface, in a dashboard, or in some other way that communicates the occurrence of the anomaly.

Figure 3:
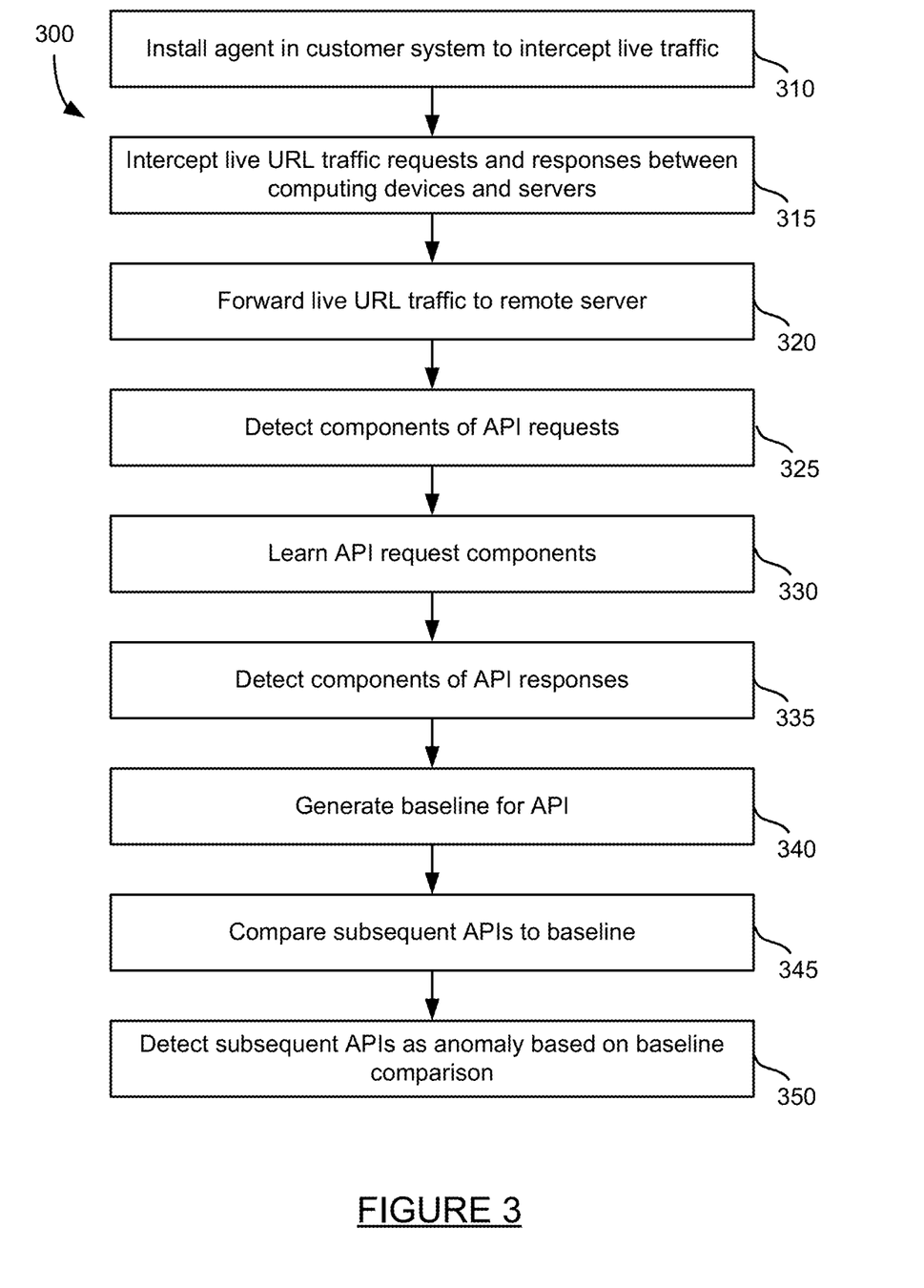
FIG. 3 is a method that automatically generates an API description.

FIG. 3 is a method that automatically generates an API description. First, an agent may be installed in a customer system to intercept live traffic at step 310. The installation may include one or more agents, as needed, to intercept API requests. The live URL traffic consisting of requests and responses may then be intercepted between user computing devices and servers at step 315. The live URL traffic, including requests, responses, and other communications between a server and a client device, may be forwarded to a remote server at step 320. The remote server may include an application that automatically generates an API description, as discussed in more detail below, and performs other functionality discussed herein.

Components of API requests may be detected at step 325. In some instances, different types of requests API parameters may be detected, including path parameters, query parameters, and other parameters. Detecting components of an API request is discussed in more detail with respect to method of FIG. 4.

API requests components can be learned at step 330. Learning the API request components includes accessing the intercepted traffic and analyzing the traffic for components and parameters that appear in the traffic. More detail for learning API request components is discussed with respect to the method of FIG. 5.

Components of API resources may be detected at step 33. The API responses may be analyzed to detect an API header, API body, and other components of an API response. In addition to API response components, parameters within an API response are detected as well. The detected API response parameters include parameter type (string, integer, float, etc.), sensitivity, character distribution, length of value, and other parameters.

A baseline is then generated for an API at step 340. The baseline may include data for the API description as determined by the histogram, as well as other sources. Subsequent APIs may be compared to the baseline at step 345. The subsequent APIs may be compared to determine if they match the API or differ from the API. Subsequent APIs may be detected as an anomaly based on the baseline comparison at step 350. In some instances, if a subsequent API compared to a baseline does not match the baseline, the subsequent API may be identified as an anomaly. Step 350 is discussed in more detail with respect to the method of FIG. 6.

Figure 4:
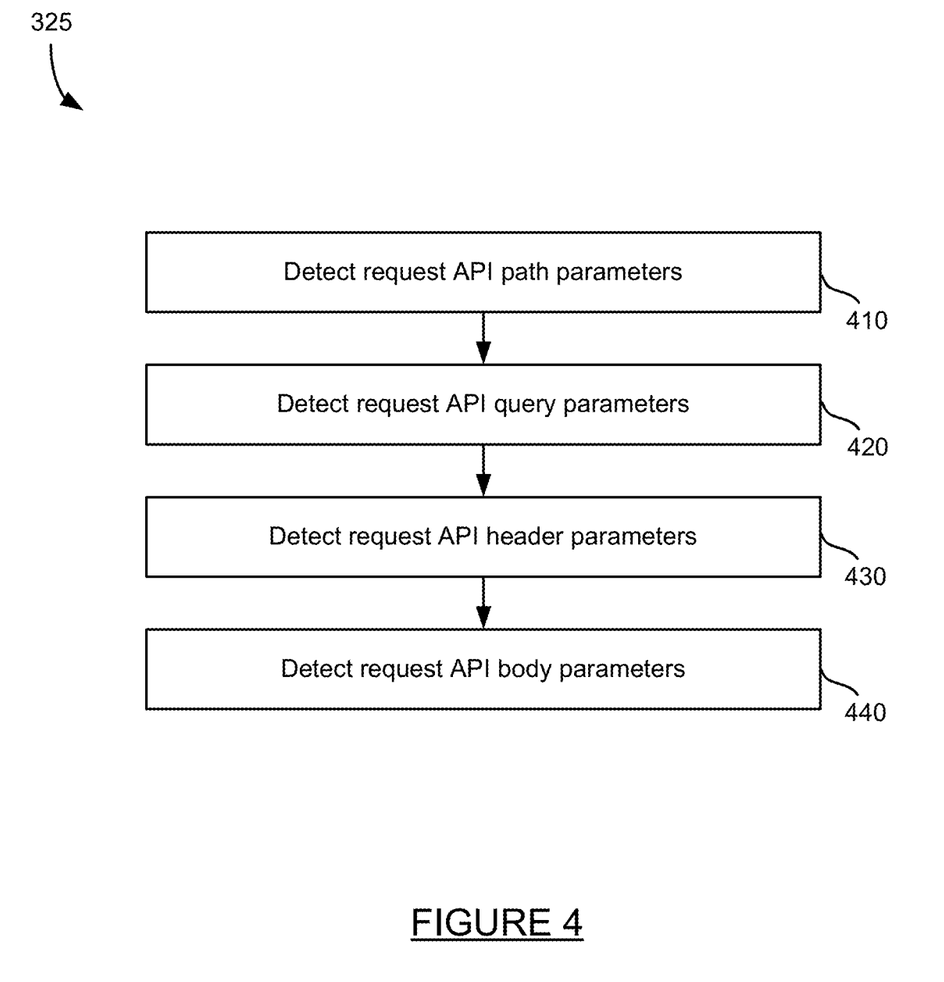
FIG. 4 is a method for detects components of API requests.

FIG. 4 is a method for detecting components of API requests. The method of FIG. 4 provides more detail for step 325 of the method of FIG. 3. First, request API path parameters are detected at step 410. API path parameters may be detected within a URL to which an API request is addressed to. Examples of requests API path parameters include a value type, value length, sensitivity, special character distribution, such as the number of slashes or semicolons, and other values.

A request API query parameter is detected at step 420. The API query parameter may be detected within the URL of an API request, and can include one or more alphanumeric characters and special characters, such as a question mark character.

API header parameters may be detected at step 430. API header parameters may include a cookie, authorization token, and other parameters that are located within the body of an API header. In some instances, detected parameters within an API request header include value type (string, integer, float, etc.), sensitive data, character distribution, value length, and other parameters.

Parameters within an API request body are detected at step 440. In some instances, API request body parameters may include input data for the request, a JSON object, data that may be too sensitive to place in a URL, and other data. In some instances, detected parameters within an API request body include value type (string, integer, float, etc.), sensitive data, character distribution, value length, and other parameters.

Figure 5:
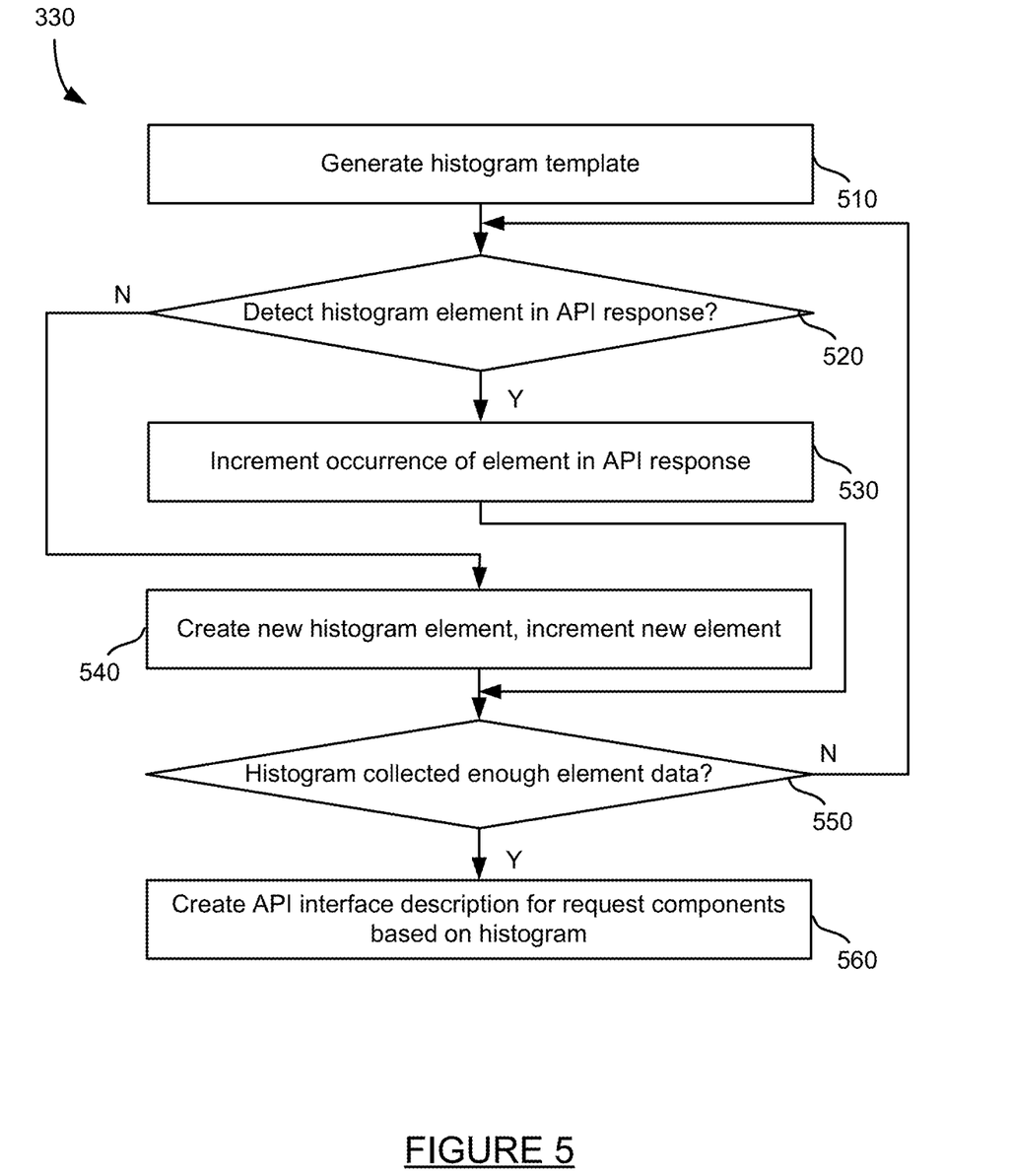
FIG. 5 is a method learns API request components.

FIG. 5 is a method for learning API request components. The method of FIG. 5 provides more detail for step 330 of the method of FIG. 3. A histogram template is generated at step 510. The histogram template may be generated automatically based on intercepted API behavior, for example including components for each type of detected API component and parameters for type of parameter. In some instances, a histogram template can be based on a default template or generated in some other manner. The template may include one or more API components and one or more parameters for each component.

As components and parameters are detected in intercepted traffic, they histogram is updated to reflect the occurrence of the component or parameter. A determination is made as to whether a detected API response component or parameter exists as a histogram element at step 520. If the API response component or parameter exists as a histogram element, the occurrence of the element in the API response is incremented at step 530 and the method of FIG. 5 continues to step 590. If the histogram element is not detected in API response, a new histogram element is created and the new element is incremented at step 540. The method of FIG. 5 then continues to step 550.

A determination is made as whether histogram has collected enough element data at step 550. In some instances, in order to rely on the histogram data to generate an API description, which includes typical API specification components and additional components, there may be a determination as to whether enough data has been gathered. In some instances, the data may be enough if there is at least a minimum number of API requests and responses received, such as 20, 50, 70, 100, or some other number. In some instances, the data may be enough if a period of time has transpired, such as 5 minutes, 10 minutes, 30 minutes, or some other period of time. In some instances, there is enough data if a histogram component or element has a minimum number of occurrences, such as for example 10, 15, 20, 30, 50, or some other number of occurrences.

If the histogram is not collected enough element data, the method returns to step 520. If enough data has been collected, an API interface description is created for request components based on the histogram at step 560.

Tallying histogram element occurrences can be performed in several ways. For example, determining if enough histogram element data has been collected can be performed per API, per component, and/or per parameter. Combinations of requirements can also be implemented. For example, for a particular histogram element to be used to create an API interface description, it may require that at least 10 instances of the API component or parameter are detected and that API traffic has been monitored for at least 5 minutes. It may also be required that the intercepted traffic received for an API is from a minimum number of different sources. Further, once a histogram element is determined to have enough data and an API interface description is generated, the system may continue to intercept API traffic and increment histogram element occurrences. As such, if a histogram element changes over time after an initial API interface description has been created, the API interface description may be changed if the histogram occurrences change over time as well.

Figure 6:
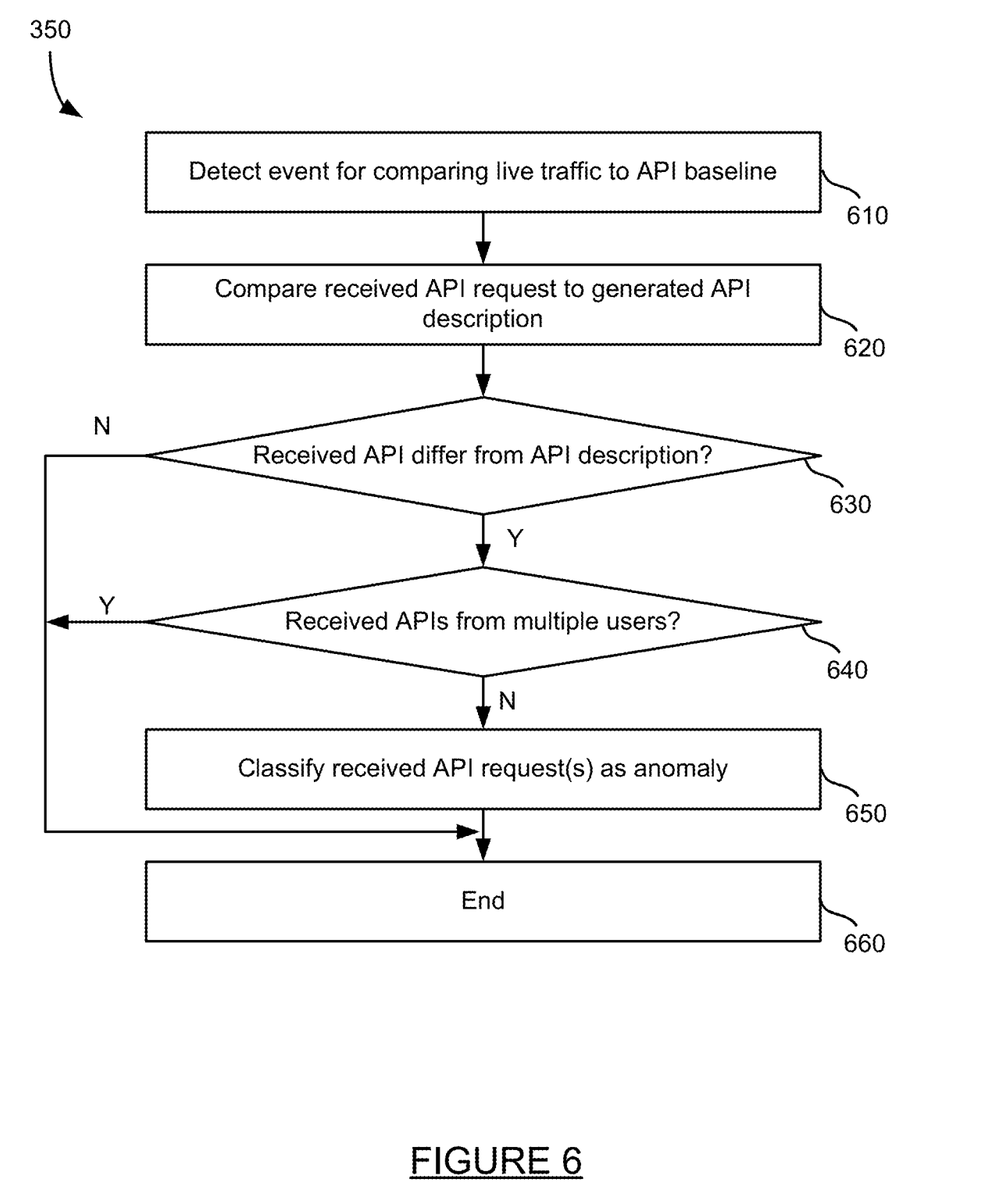
FIG. 6 is a method for detecting subsequent APIs as an anomaly based on a baseline comparison.

FIG. 6 is a method for detecting subsequent APIs as an anomaly based on a baseline comparison. The method of FIG. 6 provides more detail for step 350 of the method of FIG. 3. An event is detected for comparing live traffic to an API baseline at step 610. The event may include period of time, or some other event.

A received API request is compared to a generated API description at step 620. In some instances, the received API request may be one of several API requests compared to a generated API description component or parameter.

A determination is then made as to the received API differs from the API description at step 630. If the API does not differ from the API description, a determination is made that the API request is not an anomaly at step 660 and the method of FIG. 6 ends.

If the received API differs from the API description, in some instances, additional analysis can be performed before determining the API is anomalous. For example, if the receive API is one of several received APIs that do not match the API description, there may be a determination as to whether the multiple non-matching APIs are from different users. A determination as to whether received APIs that don't match an API description are received from multiple users at step 640. Generally speaking, it is not desirable to receive several anomalous requests from a single. To do so could allow the single user to recalibrate data from which the baseline is generated. If the anomalous received APIs are received by different users, the method of FIG. 6 continues to step 630. If the anomalous received APIs are not received by different users, the received API request is classified as an anomaly at step 650, and the method ends at step 660.

Figure 7:
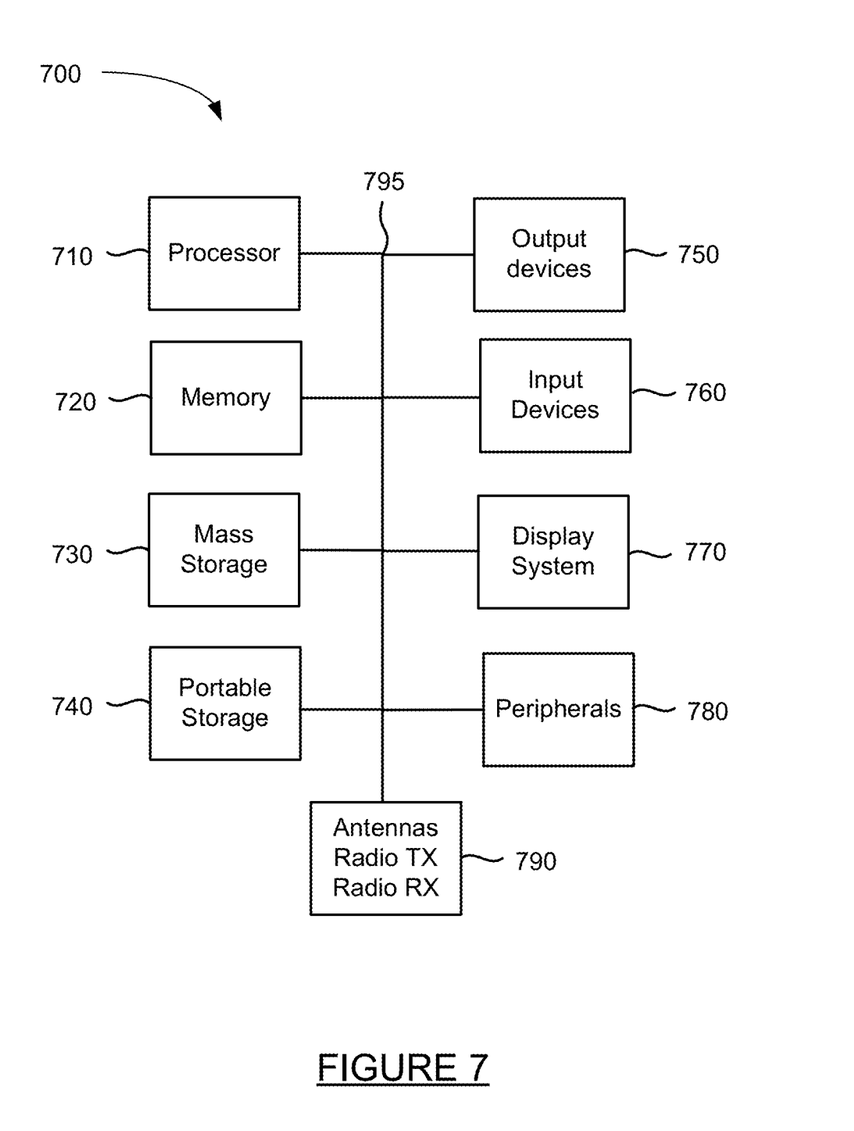
FIG. 7 is a block diagram of a system for implementing machines that implement the present technology.

FIG. 7 is a block diagram of a system for implementing machines that implement the present technology. System 700 of FIG. 7 may be implemented in the contexts of the likes of machines that implement client devices 110-140, customer server 150, Application server 170, and data store 180. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive, an optical disk drive, a flash drive, or other device, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, USB drive, memory card or stick, or other portable or removable memory, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information and processes the information for output to the display device. Display system 770 may also receive input as a touch-screen.

Peripherals 780 may include any type of computer support device to add additional functionality to the computer system. For example, peripheral device(s) 780 may include a modem or a router, printer, and other device.

The system of 700 may also include, in some implementations, antennas, radio transmitters and radio receivers 790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically determining a description of interfaces to APIs for a web service, the method comprising:
receiving, by a server from an agent stored on a remote server, API requests sent from a plurality of users to server APIs, the requests intercepted by the agent on the remote server;
automatically detecting components of the API requests by an application on the server, the components including URL parameters, API request header data, and API request body data;
automatically learning a correct set of request components by the application based on the API components detected by the application; and
detecting anomaly requests to the server API based on comparing subsequent server API requests to the learned correct set of request components,
wherein detecting anomaly requests includes:
detecting a set of multiple API requests having request components that differs from the learned correct set of request components,
detecting that the set of multiple API requests is received from a number of users that does not satisfy a threshold, and
determining that the set of multiple API requests is an anomaly based on the difference from the learned correct set of request components and the number of users not satisfying the threshold.

2. The method of claim 1, wherein automatically learning includes determine the occurrences of each component, wherein the correct set of request components is based on the highest number of occurrences for a particular component.

3. The method of claim 2, further including generating a histogram based on the occurrences of each request component.

4. The method of claim 1, further comprising identifying an API description based on the learned correct set of components.

5. The method of claim 4, further comprising:
receiving, by the server from the agent stored on the remote server, subsequent API requests sent from a plurality of users to server APIs, the requests intercepted by the agent on the remote server; and updating the learned correct set of request components by the application based on the API components detected in the in the subsequent API requests by the application.

6. The method of claim 1, wherein the automatically detected components include a special character distribution in an API path parameter.

7. A non-transitory computer readable storage medium having embodied thereon a program, the program being executable by a processor to perform a method for automatically determining a description of interfaces to APIs for a web service, the method comprising:
receiving, by a server from an agent stored on a remote server, API requests sent from a plurality of users to server APIs, the requests intercepted by the agent on the remote server;
automatically detecting components of the API requests by an application on the server, the components including URL parameters, API request header data, and API request body data;
automatically learning a correct set of request components by the application based on the API components detected by the application; and
detecting anomaly requests to the server API based on comparing subsequent server API requests to the learned correct set of request components,
wherein detecting anomaly requests includes:
detecting a set of multiple API requests having request components that differs from the learned correct set of request components,
detecting that the set of multiple API requests is received from a number of users that does not satisfy a threshold, and
determining that the set of multiple API requests is an anomaly based on the difference from the learned correct set of request components and the number of users not satisfying the threshold.

8. The non-transitory computer readable storage medium of claim of claim 7, wherein automatically learning includes determine the occurrences of each component, wherein the correct set of request components is based on the highest number of occurrences for a particular component.

9. The non-transitory computer readable storage medium of claim of claim 8, further including generating a histogram based on the occurrences of each request component.

10. The non-transitory computer readable storage medium of claim of claim 7, further comprising identifying an API description based on the learned correct set of components.

11. The non-transitory computer readable storage medium of claim of claim 10, further comprising:
receiving, by the server from the agent stored on the remote server, subsequent API requests sent from a plurality of users to server APIs, the requests intercepted by the agent on the remote server; and
updating the learned correct set of request components by the application based on the API components detected in the subsequent API requests by the application.

12. The non-transitory computer readable storage medium of claim of claim 7, wherein the automatically detected components include a special character distribution in an API path parameter.

13. A system for generating application program interfaces (APIs) from uniform resource locator (URL) information, comprising:
a server including a memory and a processor; and
one or more modules stored in the memory and executed by the processor to receive, by a server from an agent stored on a remote server, API requests sent from a plurality of users to server APIs, the requests intercepted by the agent on the remote server, automatically detect components of the API requests by an application on the server, the components including URL parameters, API request header data, and API request body data, automatically learn a correct set of request components by the application based on the API components detected by the application, and detect anomaly requests to the server API based on comparing subsequent server API requests to the learned correct set of request components, wherein the one or more modules are further executable to detect a set of multiple API requests having request components that differs from the learned correct set of request components, detect that the set of multiple API requests is received from a number of users that does not satisfy a threshold, and determine that the set of multiple API requests is an anomaly based on the difference from the learned correct set of request components and the number of users not satisfying the threshold.

14. The system of claim 13, wherein automatically learning includes determine the occurrences of each component, wherein the correct set of request components is based on the highest number of occurrences for a particular component.

15. The method of claim 14, further including generating a histogram based on the occurrences of each request component.

16. The method of claim 13, further comprising identifying an API description based on the learned correct set of components.

17. The method of claim 16, further comprising:
receiving, by the server from the agent stored on the remote server, subsequent API requests sent from a plurality of users to server APIs, the requests intercepted by the agent on the remote server; and
updating the learned correct set of request components by the application based on the API components detected in the subsequent API requests by the application.

18. The method of claim 13, wherein the automatically detected components include a special character distribution in an API path parameter.

* * * * *